(12) United States Patent
Bröker

(10) Patent No.: US 7,539,669 B2
(45) Date of Patent: May 26, 2009

(54) METHODS AND SYSTEMS FOR PROVIDING GUIDED NAVIGATION

(75) Inventor: Norbert Bröker, Rauenberg (DE)

(73) Assignee: SAP AG, Walldorf (DE)

( * ) Notice: Subject to any disclaimer, the term of this patent is extended or adjusted under 35 U.S.C. 154(b) by 460 days.

(21) Appl. No.: 11/050,704

(22) Filed: Feb. 7, 2005

(65) Prior Publication Data

US 2006/0179035 A1   Aug. 10, 2006

(51) Int. Cl.
*G06F 17/30* (2006.01)

(52) U.S. Cl. ............................ 707/3; 707/5; 707/102; 715/968

(58) Field of Classification Search ............ 707/1, 707/3, 5, 102; 715/968
See application file for complete search history.

(56) References Cited

U.S. PATENT DOCUMENTS

| | | | | |
|---|---|---|---|---|
| 5,873,080 | A * | 2/1999 | Coden et al. | 707/3 |
| 6,233,586 | B1 * | 5/2001 | Chang et al. | 707/103 R |
| 6,385,602 | B1 * | 5/2002 | Tso et al. | 707/3 |
| 6,944,612 | B2 * | 9/2005 | Roustant et al. | 707/3 |
| 7,035,842 | B2 * | 4/2006 | Kauffman et al. | 707/3 |
| 2005/0210007 | A1 * | 9/2005 | Beres et al. | 707/3 |
| 2005/0246324 | A1 * | 11/2005 | Paalasmaa et al. | 707/3 |
| 2006/0026152 | A1 * | 2/2006 | Zeng et al. | 707/5 |

* cited by examiner

*Primary Examiner*—Shahid A Alam
*Assistant Examiner*—Phong Nguyen
(74) *Attorney, Agent, or Firm*—Finnegan, Henderson, Farabow, Garrett & Dunner, LLP.

(57) ABSTRACT

Methods and systems are disclosed for providing guided navigation across different types of result objects. The methods and systems may receive a search request and generate a search result based on the search request, the search result including result objects of different object types. Further, the methods and systems may normalize the result objects based on metadata associated with generic attributes related to each object type. Based on the normalization, guided navigation results are generated across the different object types of the result objects. Further, the methods and systems may create a metadata database by defining object types for result objects that are generated in response to a search request and defining generic attributes corresponding to the object types. The generic attributes reflect attributes that apply to all object types. The database is generated based on the defined object types and generic attributes, and includes metadata used to provide guided navigation across different types of the result objects.

33 Claims, 9 Drawing Sheets

METHODS AND SYSTEMS FOR PROVIDING GUIDED NAVIGATION

TECHNICAL FIELD

The present invention generally relates to information retrieval based on a user query and, more particularly, to systems and methods for providing guided navigation of retrieved information.

BACKGROUND

The advent and growth of the World Wide Web and networking software enable private individuals and business personnel to access information from an increasing number of sources, such as web servers, database servers, enterprise systems, and other forms of information storage systems. The type of information available is also diverse. A user may access structured information (e.g., data stored in tables of a database) and unstructured information (e.g., Hypertext Markup Language (HTML) documents obtained from a Web server on the Internet).

The large number and types of documents available makes the search for specific or relevant information a complex and difficult task. To find such information, users often take advantage of search engines to help generate lists of potentially relevant documents. Conventional search engines allow a user to input a search request in a computer system and receive a result list of objects based on the search criteria included in the user's request. In the event the result list contains a large number of objects, the user generally has to refine the search criteria in the request to obtain a smaller result list.

To address this problem, modern search engines support the user in narrowing down a result list by providing guided navigation processes. In guided navigation, the search engine not only presents a result list, but also a number of refinement possibilities that are automatically derived from the objects in the result list. For example, in addition to presenting a list of Web pages that contain a search term provided by a user, modern Web-based search engines may also present a list of additional search terms that occur in the objects of the result list (i.e., the list of Web pages). Selecting one of these additional terms will return a new result list that includes objects matching the original search term and the selected additional term.

Other search engines provide guided navigation for certain types of structured information, such as those found in database applications. Instead of searching for a search term in an entire document, as done by Web search engines, structured-based search engines may use search criteria that require the search term to appear in an attribute of an object (i.e., "John" as the middle name in an address database). Because it is possible to display value ranges for specific database attributes, guided navigation may be more specific with these types of search engines. The value ranges may be automatically determined in order to split the result list into smaller chunks of data. The attributes provided by this form of guided navigation depend on the object type of the result objects.

Although the above-mentioned search engines provide ways to refine a result list of objects, problems arise when different objects types need to be searched using one search engine and presented in one result list. For instance, in an enterprise portal environment, a user requesting information regarding a given product may receive a result list including information reflecting technical drawings, customer order data, delivery information, meeting minutes, etc. Because the result list contains many types of objects and the attributes used for conventional guided navigation depend on the object type, current search engines do not provide guided navigation across the entire result list. Thus, there is a need for a search engine that provides guided navigation across different object types of a result list.

SUMMARY

The present invention is directed to methods and systems that improve access to relevant information. In one aspect of the present invention, a computer-implemented method is disclosed for providing guided navigation across different types of result objects. The method may include receiving a search request and generating a search result based on the search request, the search result including result objects of different object types. Further, the method includes normalizing the result objects based on metadata associated with generic attributes related to each object type. Based on the normalization, guided navigation results are generated across the different object types of the result objects.

In another aspect, methods and system may perform a method for providing guided navigation including defining object types for result objects that are generated in response to a search request and defining generic attributes corresponding to the object types, the generic attributes reflecting attributes that apply to all object types. The method further includes generating a database based on the defined object types and generic attributes, the database including metadata used to provide guided navigation across different types of the result objects.

Also, methods and systems consistent with another aspect of the invention may perform a computer-implemented guided navigation that includes generating a search request and receiving search results based on the search request, the search results including result objects of different object types. The method further including receiving guided navigation results for refining the search results, the guided navigation results generated by metadata that map generic attributes describing characteristics of all of the different object types and individual attributes associated with result objects of each object type.

In another aspect, a computer-readable memory device encoded with a data structure used to provide guided navigation may include a first set of data reflecting generic attributes corresponding to characteristics for result objects generated in response to a search request, the result objects including different types of objects. Also, the data structure may include a second set of data reflecting object types associated with the result objects and metadata mapping the generic attributes to corresponding individual attributes associated with the object types. The metadata is used by a search engine to provide guided navigation across the result objects.

In yet another aspect, a system for displaying guided navigation results may include a display device and a computer system for executing code that displays a user interface on the display device. The user interface may include a first container including a list of result objects of different object types generated in response to a search request. Also, the user interface may include a second container including the guided navigation results used to refine the search request. In certain aspects, the second container may include sub-containers each associated with one of a number of generic attributes corresponding to characteristics of each of the different types of result objects, each sub-container including a list reflecting a sub-set of the result objects that include individual attributes corresponding to an associated generic attribute. The guided navigation results may be generated based on metadata that maps the generic attributes to the individual attributes of the result objects.

Further, a system for providing guided navigation across different types of result objects may include a first computer system that provides a search request and a second computer system that generates search results based on the search request, the search results including result objects of different object types. The second computer system may also normalize the result objects based on metadata associated with individual attributes related to each object type. Moreover, the second computer system generates guided navigation results across the different object types of the result objects based on the normalization.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, show certain aspects of the present invention and, together with the description, help explain some of the principles associated with the invention.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

Overview

Methods and systems consistent with certain aspects of the present invention provide guided navigation results across different object types of a result list produced by a search engine. In one aspect, a metadata database is constructed including mappings between generic object attributes and individual object attributes. The generic attributes correspond to a list of predetermined attributes that are used for providing refined searched results across different given object types. The individual object attributes correspond to those real attributes of each given object type.

In another aspect, the metadata database is used to provide guided navigation results to a user. For example, a user may provide a search request including one or more search terms to a search engine. Based on these terms, the search engine provides a result list of objects. The list may include objects of different types, such as structured database objects and unstructured Web-based documents. Methods and systems consistent with aspects of the invention use the metadata database to normalize the result list across the different object types. Based on the normalization, guided navigation results are provided that span the various object types and their corresponding generic attributes previously defined. Thus, along with a result list including result objects, a user may also receive one or more refinement interfaces that include guided navigation results that span different result object types. The guided navigation results enable the user to further limit the pool of information provided in the result lists. Further, aspects of the invention provide results to a user in such a manner that enables the user to manipulate a result list with different object types in a manner similar to result lists containing only objects of a single type.

The foregoing discussion is intended to introduce and provide initial clarity for some of the aspects associated with the present invention. Further details of the above-mentioned functionality and additional aspects, features, and embodiments of the present invention are described below.

Exemplary System Environment

Figure 1:
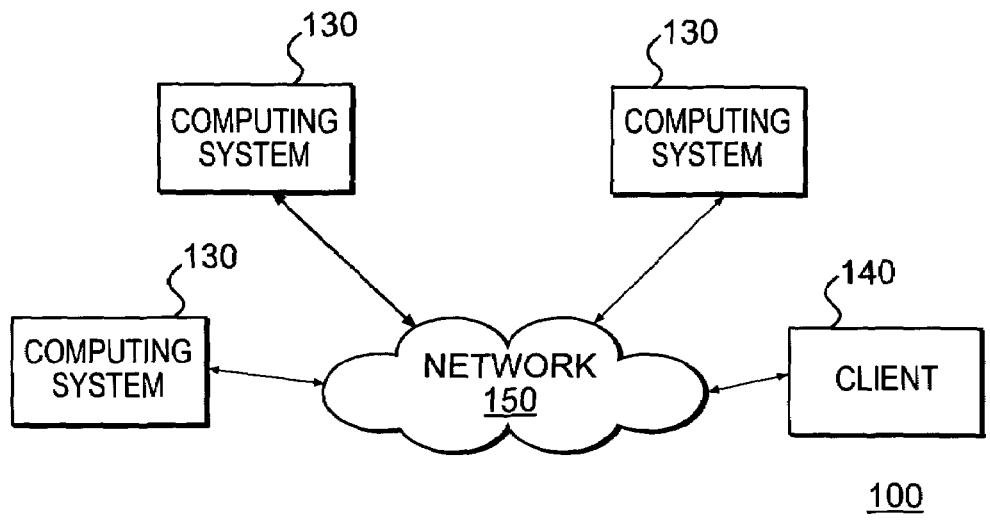
FIG. 1 illustrates a block diagram of an exemplary system environment consistent with certain aspects related to the present invention.
Figure 1:
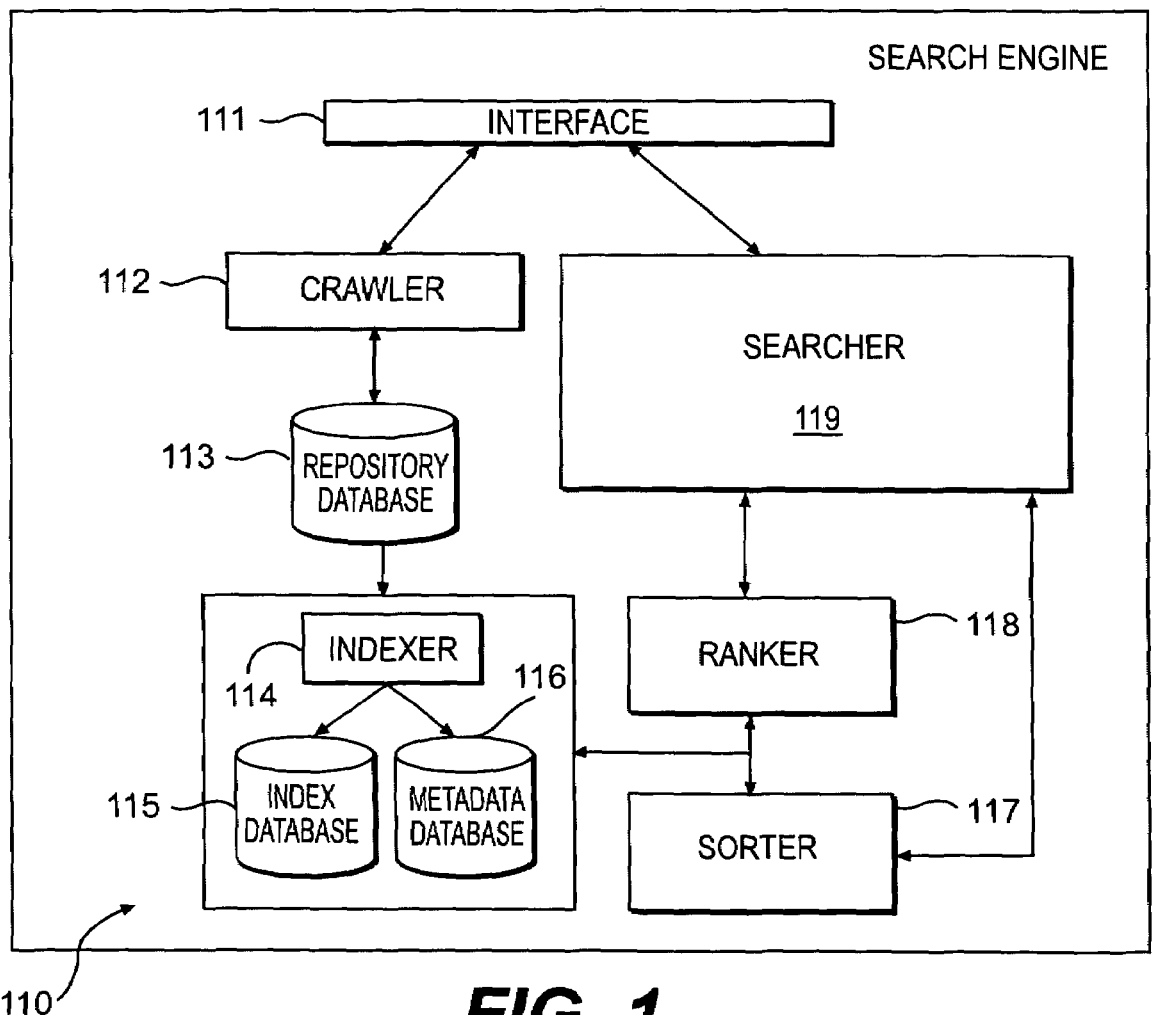

FIG. 1 illustrates a block diagram of an exemplary system environment 100 consistent with certain aspects related to the present invention. As shown, system environment 100 includes a search engine 110, computing systems 130, client system 140, and network 150.

Search engine 110 is a computing system that searches for objects having search terms included in a received search request. The term "object," as used herein refers to anything that may be located and included in a search result produced by search engine 110. An object may be structured or unstructured. For example, objects may include HTML documents from the Internet, a document from a document repository, and a file or information included in a structured database, such as a sales order form or a customer address in an address database. In one example, search engine 110 may include interface 111, crawler 112, repository database 113, indexer 114, index database 115, metadata database 116, sorter 117, ranker 118, and searcher 119.

Interface 111 may be hardware, software, or a combination of both, that facilitates communications between search engine 110 and external systems or networks. Interface 111 may be any known interface system, software, and circuitry that allows information to be exchanged with search engine 110. As shown in FIG. 1, interface 111 provides communications between network 150 and search engine 110.

Crawler 112 may be a system that performs known network crawling processes. For example, crawler 112 may be one or more processes that, when executed by a processor, downloads Web pages or documents from the Internet.

Crawler 112 may also crawl enterprise databases or receive updates for databases to include structured information into repository 113. Crawler 112 may operate in conjunction with a server system that provides lists of Uniform Resource Locators (URLs) to be fetched by crawler 112. The information fetched by crawler 112 is stored in repository database 113 that may be one or more memory devices configured to store information. For example, repository database 113 may store HTML data of Web pages obtained by crawler 112.

Indexer 114 may be a system that performs known indexing processes for search engine environments. For example, indexer 114 may create an index of the content of the Web pages and documents obtained by crawler 112. Indexer 114 reads and parses the information stored in repository 113 and creates references to the information stored in repository 113. Indexer 114 may convert the information in repository 113 into word occurrences that are distributed to index database 115, which is one or more memory devices configured to store information.

In one aspect of the invention, search engine 110 may also include metadata database 116 that is one or more memory devices configured to store information. Metadata database 116 stores metadata tables created by search engine 110 and used to provided guided navigation in a manner consistent with certain aspects related to the present invention. Although FIG. 1 shows metadata database 116 operable with indexer 114, other processing systems may implement metadata database 116 to generate the metadata tables. For example, a server working in conjunction with indexer 114 may execute one or more processes that generate and manipulate the metadata tables stored in metadata database 116.

Sorter 117 may be one or more known search engine sorting systems that sort the information stored in index database 115. Sorter 117 provides the sorted information to searcher 119 for processing search requests received by search engine 110. Ranker 118 may be one or more known ranking systems that weighs one or more factors associated with the information processed by indexer 114. Based on these factors, ranker 118 may rank the information obtained by search engine 110 to provide relevant information for a search request.

Searcher 119 may be one or more known search systems that processes search requests received by search engine 110 through interface 111. When searcher 119 receives a search request, it may parse the request, leverage components within search engine 110 (e.g., indexer 114, index database 115, ranker 118, sorter 117, etc.) to locate documents that match best with the search terms included in the search request. Searcher 119 ensures that documents that include words that match the search terms are ranked and sorted, and provides these documents as objects in a search result. Interface 111 configures the search result into an appropriate format and provides the objects to the system that initiated the search request.

In addition to performing known search request processes, search engine 110 may also perform guided navigation processes consistent with certain aspects of the invention. In one aspect, search engine 110 includes systems that perform one or more processes for creating metadata tables and providing guided navigation across different objects types of the search results produced by search engine 110. Alternatively, searcher 119 may leverage other components to perform guided navigation processes. For example, searcher 119 may implement a Web server that generates one or more user interfaces corresponding to the search results produced in response to a user's search request. Additionally, searcher 119 may process user requests for guided navigation of the search results. Thus, searcher 119 may leverage the Web server to generate user interfaces providing results of the guided navigation.

Computing systems 130 may be one or more systems that generate and maintain information searched by search engine 110 to produce search results. For example, computing systems 130 may include Web servers that maintain and provide Web pages and database servers that maintain one or more structured databases. Computing systems 130 may or may not be associated with search engine 110. That is, one or more of computing systems 130 may be server systems that are affiliated with a business entity that implements search engine 110, such as servers used in enterprise resource planning systems (e.g., application servers, portal servers, etc.) for a business organization. Alternatively, one or more of computing systems 130 may be third party server systems that have no business affiliation with search engine 110.

Client 140 may be one or more computer systems that perform known client type operations. Client 140 may execute one or more processes that provide user interfaces that allow a user to generate search requests and receive corresponding search results. Further, client 140 may display user interfaces corresponding to the search and guided navigation results produced by search engine 110. Client 140 may or may not be associated with search engine 110. For instance, client 140 may be a computer system that is operated by an employee of a business entity that implements search engine 110 and/or one or more of computing systems 130. Alternatively, client 140 may be a third party computer system that is operated by private individuals that leverage search engine 110 to receive search results and corresponding guided navigation consistent with certain aspects related to the present invention.

Network 150 may be one or more communication networks that facilitate communications between computing systems 130, client 140, and search engine 110. Based on the configuration of environment 100, network 150 may include one or more of an Extranet, an Intranet, the Internet, a Local Area Network (LAN), public switch telephone network, Integrated Services Digital Network (ISDN), radio links, Global System for Mobile Communication (GSM), and any other form of wired or wireless communication networks. Accordingly, network 150 may be compatible with any type of communication protocol used by the components of environment 100 to exchange information, such as Transmission Control/Internet Protocol (TCP/IP), Hypertext Transfer Protocol (HTTP), Wireless Application Protocol (WAP), extensible Markup Language (XML), Wireless Markup Language, etc.

Although methods and systems of the present invention may implement system environment 100 to provide guided navigation results, it is not intended to be limiting. That is, aspects of the present invention may be implemented by other systems and environments that may be distributed or non-distributed. For example, search engine 110 may be located on the same computing platform as a computing system that provides result objects for the search engine. Alternatively, search engine 110 may be located on a computing platform shared by client 140 that is used by an individual to generate search requests and guided navigation requests. Further, although FIG. 1 shows components of environment 100 as separate entities, the components may be hardware and/or software that share part of the same computing system or memory system.

Creating Metadata Tables

Figure 2:
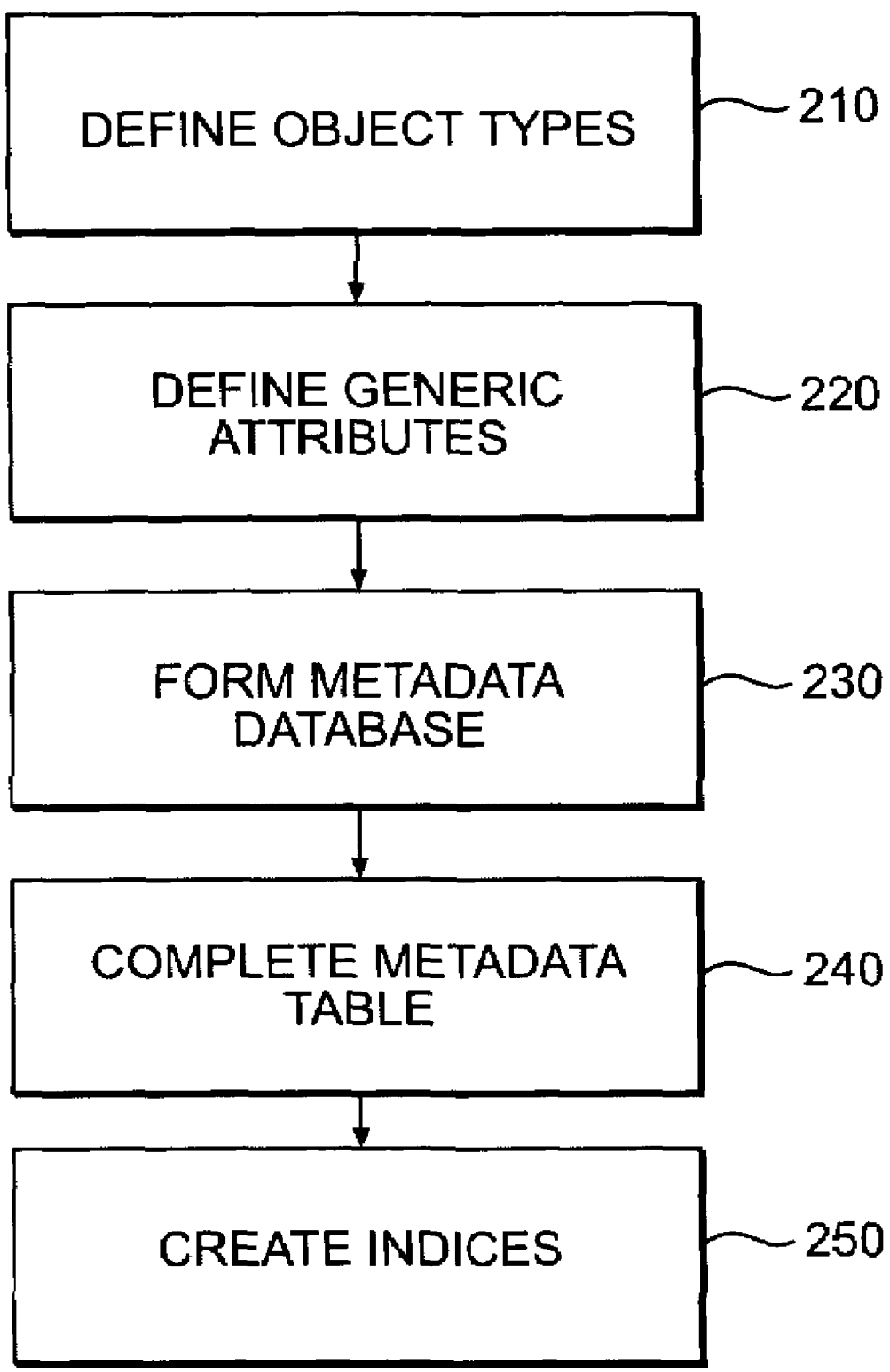
FIG. 2 illustrates a flowchart of an exemplary metadata table generation process consistent with certain aspects related to the present invention.

As explained, methods and systems consistent with aspects of the present invention leverage metadata tables stored in metadata database 116 to provide guided navigation for the search results produced by search engine 110. FIG. 2 illustrates a flowchart of an exemplary metadata table generation process consistent with one aspect of the invention. Search engine 110 may leverage one or more of its components to perform the metadata table generation process, such as a server within indexer 114, searcher 119, etc.

The process may begin by defining object types associated with objects that may be included in search results produced by search engine 110 (Step 210). Defining object types may be performed manually, automatically, or by a combination of computer executed processes and user input. Object types define the structure of an object, such as defining the object's individual object attributes and their corresponding valid data values. Attributes may include the identification or content of an object and a legal value range. For example, a customer's name may be an identification attribute for a customer address object type and a due date may be a content attribute for a sales order object type, with the legal values for this attribute being calendar date data values.

Because objects may be structured or unstructured, the types of objects defined may vary. For example, object types may include business objects, documents, and organizational documents. Business objects may be objects associated with order files for products produced or sold by a business entity, engineering files, etc. Business objects may also include customer files (e.g., name, address, etc.), material lists, and any other types of objects that may be stored in a structured database or predefined memory configuration. Documents, on the other hand, may include information that is stored in an unstructured format, such as engineering drawings for a product, news items, HTML content, etc. Organizational type objects may include information that is associated with a business entity implementing search engine 110. For example, organizational type objects may include departmental information, events, calendar entries, location information, people listings, employee address databases, etc. The foregoing list of object types are exemplary and are not intended to be limiting. Methods and systems consistent with aspects of the invention may define any number of different object types.

As the types of objects provided in a search result may vary, methods and systems of the invention define generic attributes that are available and useful across each of the defined object types (Step 220). Defining generic attributes may be performed manually, automatically, or by a combination of computer executed processes and user input, such as through a computer system operating within search engine 110. Any number of generic attributes may be defined. For example, generic attributes may include object type name, object name, creation timestamp, author, and source name. Each of the generic attributes include legal data value ranges for the attribute. Object type name may be a predetermined label for the type of object the given attribute represents. Object name is a data value reflecting a name for the object represented by that attribute. Creation timestamp may be a time/date value reflecting when the object was created, stored, etc. Author may be an attribute that reflects the creator of the given object. Source name may reflect a predetermined name for the source of the object, such as the Internet, a sales order file, etc.

Once the object types and corresponding generic attributes are defined, the metadata table generation process may form a metadata database that provides mappings between the generic attributes to the individual object type attributes (Step 230). The metadata database may include one or more metadata tables that include metadata that forms the mappings between the individual and generic attributes. A metadata table may be configured as any type of data structure to facilitate these mappings. For example, one implementation may include a table with one column for each of the generic attributes and a row for each defined object type. The cells of the metadata table may be formatted to receive metadata information reflecting the mappings between the generic attributes and the individual attributes for each object type. The mappings may correspond to the individual object attribute data values for a given generic attribute and object type. The metadata is used to provide guided navigation consistent with aspects of the present invention.

Once the metadata database is formed, the metadata tables may be completed (Step 240). Completing the metadata tables may include filling metadata cells in one or more tables with the appropriate information for mapping between the generic and individual attributes for the object types. In one aspect, the metadata cells includes data values for individual attributes that correspond to given generic attributes for each object type. Search engine 110 may store the metadata tables in metadata database 116 for subsequent access when performing guided navigation processes consistent with aspects of the invention.

Figure 3:
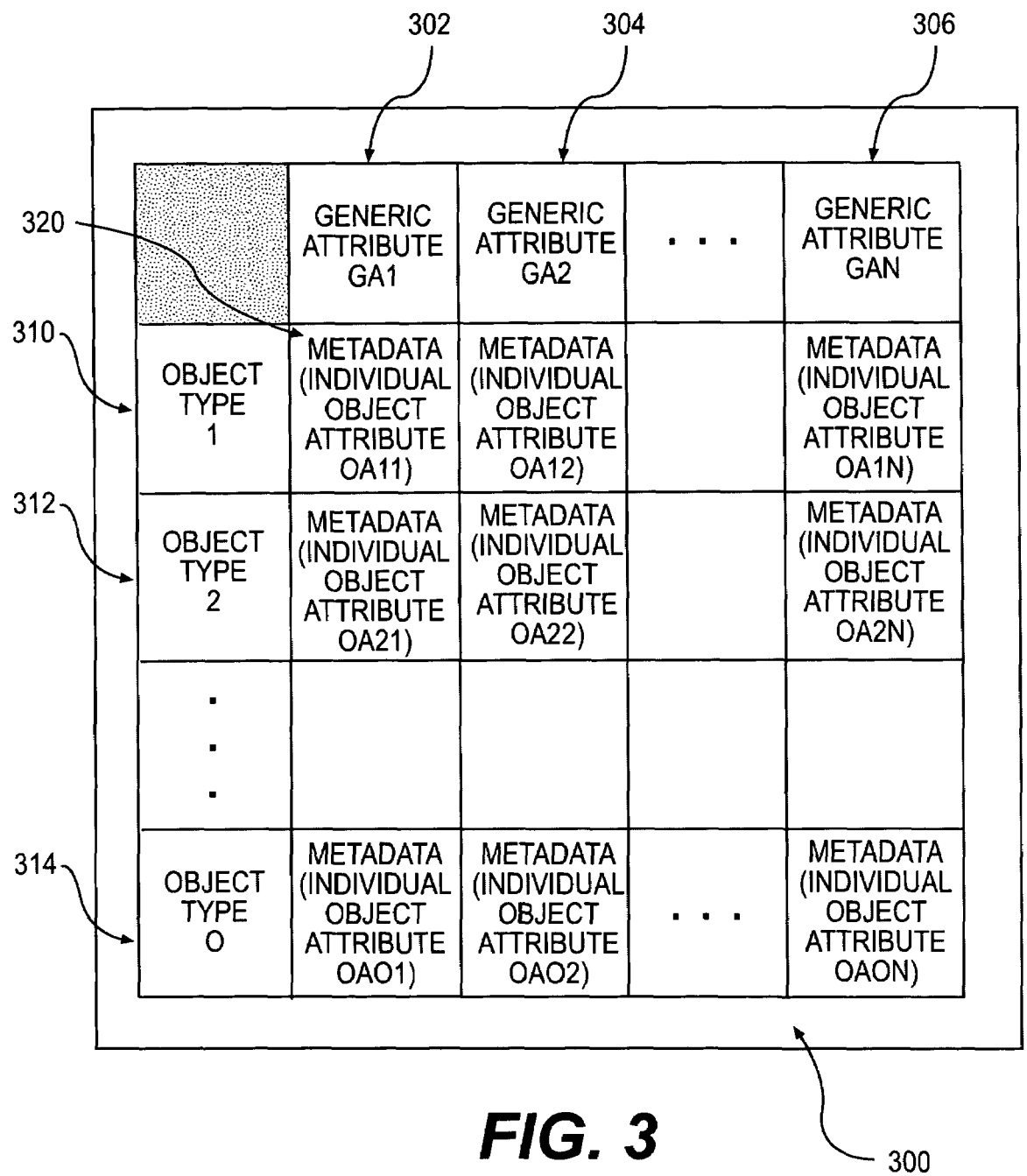
FIG. 3 illustrates a block diagram of an exemplary metadata table consistent with certain aspects related to the present invention.

To better describe the features of metadata database 116, FIG. 3 illustrates an exemplary metadata table 300. As shown, table 300 includes columns 302, 304, and 306 associated with N number of generic attributes GA1 to GAN, respectively. Table 300 also includes rows 310, 312, and 316 associated with O number of defined object types. Each cell of table 300 includes metadata 320 corresponding to mappings between the generic attributes GA1 to GAN and the individual attributes of object types 1 to O. In this example, metadata 320 reflects individual object attributes (OA11 to OA0N) for each object type corresponding to a given generic attribute.

In one aspect of the invention, methods and systems may program each cell 320 with either a predetermined fixed string or the name of an attribute of the object type used as a value for guided navigation. For exemplary purposes, Table I shows exemplary mappings for two types of objects, an Internet document type object and a business type object for a sales order entry, each associated with five generic attributes: object type name, object name, creation timestamp, author, and source name. In this example, the Internet document type object may correspond to documents related to World Wide Web-based information, such as Web pages, listings, etc. The business type object may correspond to documents related to enterprise information stored in structured databases and available through proprietary or non-proprietary enterprise systems.

TABLE I

Metadata for Exemplary Object Types and Generic Attributes

| | Generic Attributes | | | | |
|---|---|---|---|---|---|
| Object Type | Object Type Name | Object Name | Creation Timestamp | Author | Source Name |
| Internet Document (unstructured) | String value = "HTML Document" | URL of document | Date value of Individual attribute | HTML data for the author of document | String value = "Internet" |
| Sales Order Entry (structured) | String value = "Sales Order" | Data Value of database attribute "order_number" | Data Value of database attribute "created_on" | Data Value of database attribute "created_by" | String value = "Sales Department" |

As shown in Table I, the metadata for the Internet document type object may be defined based on the individual attributes of the HTML document. For instance, the object name generic attribute may be mapped to the URL of the Internet document. The creation timestamp generic attribute may be mapped to a date attribute for the HTML document. For example, this may be obtained from the HTML fragment<META name=date, content=". . . ">. The author generic attribute may be mapped to the author attribute data value, such as <META name="author" content=". . . ">. The object type name and source name generic attributes, on the other hand, may be mapped to string values defined by a user, such as "HTML Document" and "Internet," respectively. These string values give these generic attribute mappings an identifier that may be used across similar types of objects.

The metadata for the sales order object type may defined using different individual attributes. Because this type of object is a structured object, the metadata may correspond to individual database attributes that may be common to similar types of structured databases. In the example shown in Table I, the object name generic attribute may be mapped to a database attribute known to include an identifier for the database entry, such as "order_number." Along the same lines, the creation timestamp generic attribute may be mapped to the database attribute "created_on" and the author generic attribute is mapped to the database attribute "created_by." Similar to the Internet type object, the object type name and source name generic attributes for the sales order type object may be mapped to string values defined by a user, such as "Sales Order" and "Sales Department," respectively.

Accordingly, methods and systems consistent with aspects of the invention create metadata for all object types and generic attributes defined in Steps 210 and 220 described above in connection with FIG. 2. Thus, a business that has a number of structured databases storing different types of entries, such as sales orders, customer addresses, etc., may leverage these aspects of the invention to create corresponding metadata for mapping between the generic attributes and the individual attributes for any type of defined object type.

Once the metadata table(s) and database is formed and completed, the metadata table generation process may proceed to creating indices for all the defined object types in a manner consistent with the indexing functions performed by indexer 114 described above in connection with FIG. 1 (Step 250).

Guided Navigation Processes

As explained, a user operating client 140 may leverage search engine 110 to receive search results based on a generated search request. In some instances, the search results are provided as a result list of objects that may include different object types. In accordance with certain aspects of the present invention, search engine 110 performs one or more processes that provide guided navigation across the different object types included in the result list.

Figure 4:
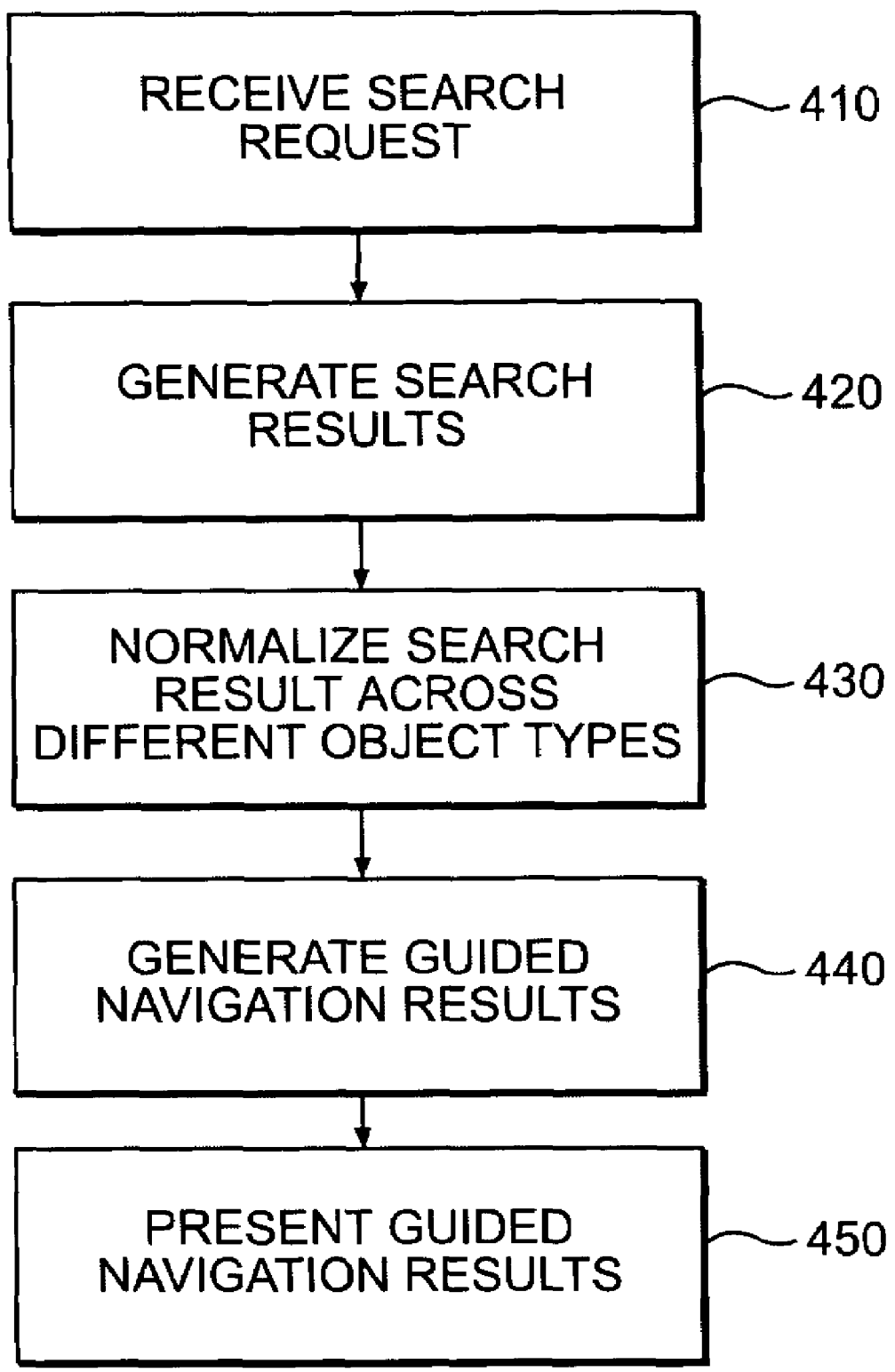
FIG. 4 illustrates a flowchart of an exemplary guided navigation process consistent with certain aspects related to the present invention.

FIG. 4 illustrates a flowchart of an exemplary guided navigation process consistent with certain aspects related to the present invention. Initially, a user operating client 140 may formulate a search request and provide the request to search engine 110, perhaps through network 150. Search engine 110 receives the search request (Step 410) and performs known search engine processes to generate a search result (Step 420). The search result may include different types of objects corresponding to those object types defined in Step 210 described above in connection with FIG. 2.

Once the search result is generated, search engine 110 may normalize the result across different object types (Step 430). Normalizing the search result enables search engine 110 to process the different object types included in the result list to provide guided navigation for the user.

Search engine 110 may then generate guided navigation results based on the normalized search result (Step 440). Generating guided navigation results may include grouping the result objects based on the generic attributes associated with object types of the result objects. Further, generating guided navigation results may include categorizing the groupings to provide one or more options for a user when implementing the guided navigation results.

Search engine 110 may then present the guided navigation results to the user (Step 450). In certain aspects related to the present invention, search engine 110 may leverage web server processes to generate user interfaces that are rendered by client 140 for display to the user who generated the search request. The user interfaces may include separate containers for the guided navigation results and active links that enable the user to select the groupings and/or categories associated with these results. Methods and systems consistent with aspects of the invention may generate and provide different types of user interfaces for the user and the examples described herein are not intended to be limiting.

Normalizing Search Results

Figure 5:
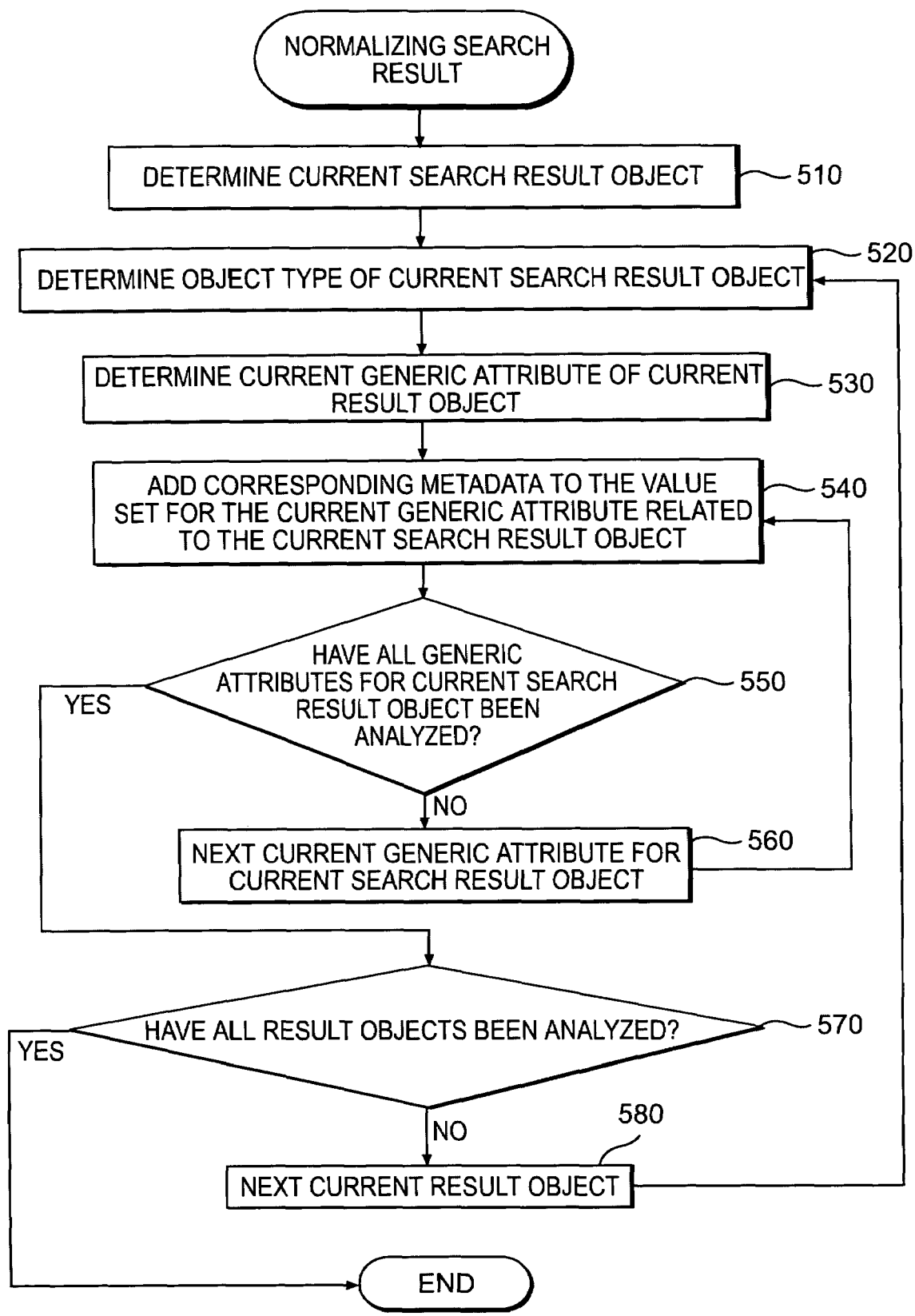
FIG. 5 illustrates a flowchart of an exemplary normalization process consistent with certain aspects related to the present invention.

As discussed above, search engine 110 may normalize the search result across different object types to generate guided navigation results. FIG. 5 illustrates a flowchart of an exemplary normalization process that may be performed by search engine 110 consistent with certain aspects related to the present invention. Initially, search engine 110 may analyze the result list to determine a current search result object for processing (Step 510). For example, search engine 110 may identify a first result object in the result list as the current result object. Once a current result object is determined, search engine 110 may determine the object type of the current result object (Step 520). The object type corresponds to one of the object types previously defined when the metadata table is constructed. For example, the current result object may be a document type object, a business type object, an organizational type object, etc. Once the object type of the current result object is determined, search engine 110 may determine a current generic attribute of the current result object (Step 530). The current generic attribute corresponds to one of the generic attributes previously defined during the metadata generation process described above in connection with FIG. 2.

Aspects of the present invention construct value sets for each generic attribute to be used in the guided navigation processes of the present invention. Each value set may include attributes associated with a result object based on the type of the result object. Therefore, search engine defines a value set for each generic attribute. To fill each set, search engine 110 accesses the metadata table(s) in metadata database 116 to obtain and add corresponding metadata to the value set for the current generic attribute and current object type (Step 540). For fixed string attributes, the string value is added to the current value set. Further, attribute reference values included in the metadata is also added to the value set. In one aspect, each value set is a multiset that can contain multiple instances of its members. Thus, if an identical metadata value is already included in the value set for the current generic attribute being processed, search engine 110 may increase an occurrence count for that particular value of the generic attribute corresponding to the current object type. For example, in the event a value set for a source name generic attribute includes two values associated with the source name "Internet," search engine 110 relates this attribute with an occurrence count of two.

Once the current generic attribute metadata value for the current result object has been added to the appropriate value set, search engine 110 determines whether all of the generic attributes for the result object have been analyzed (Step 550). If not (Step 550; NO), search engine determines a next current generic attribute for the current result object (Step 560). That is, search engine 110 selects another generic attribute for the current result object for processing and returns to Step 540 to add the corresponding metadata values to the next value set for the next current generic attribute.

Once all the generic attributes have been processed (Step 550; YES), search engine determines whether all of the result objects in the result list have been analyzed (Step 570). If not (Step 570; NO), search engine 110 selects another result object as the current result object (Step 580) and the normalization process returns to Step 520. If, however, all of the result objects have been analyzed (Step 570; YES), the normalization process ends.

Accordingly, methods and systems consistent with aspects related to the present invention access the metadata database to build value sets for each of the defined generic attributes. The value sets include occurrence data that reflects whether a particular value of an attribute is present in the result list multiple times. Thus, each value set includes information associated with each of the result objects. Search engine 110 may use the value sets to generate guided navigation results for the result objects generated in response to the received search request.

Generating Guided Navigation Results

Figure 6:
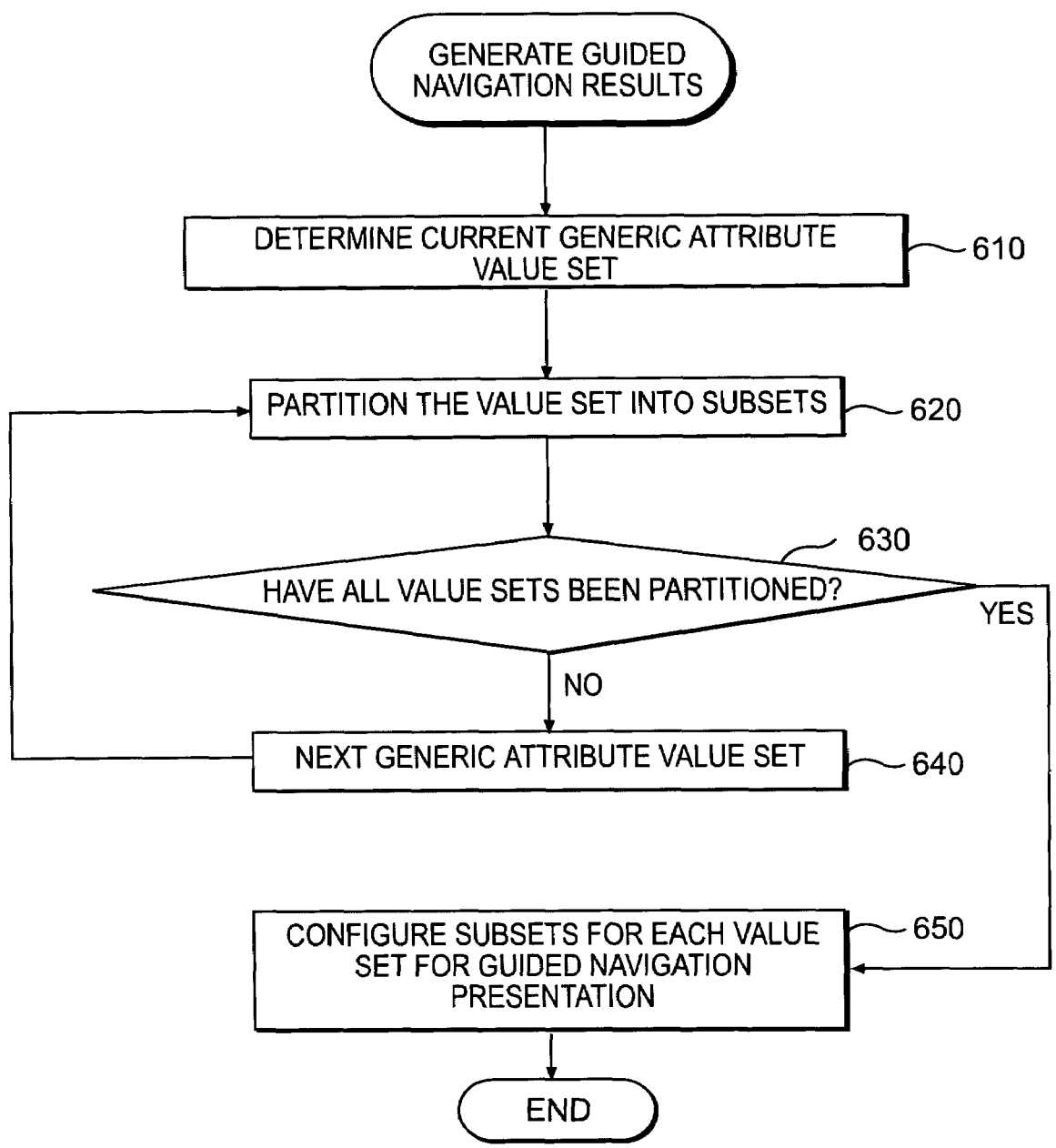
FIG. 6 illustrates a flowchart of an exemplary guided navigation result process consistent with certain aspects related to the present invention.

FIG. 6 illustrates a flowchart of an exemplary guided navigation result generation process consistent with certain aspects of the present invention. Initially, search engine 110 may determine a current generic attribute value set from among the value sets processed during the normalization process described above in connection with FIG. 5 (Step 610). Search engine 110 may then partition the current value set into a plurality of subsets (Step 620). In one aspect, search engine 110 partitions the value set into a fixed number of subsets based on the search result objects associated with the current value set being processed. For example, search engine 110 may partition the value set such that each subset refers to roughly the same number of search result objects. For instance, when partitioning a value set for an exemplary generic attribute "source name," search engine 110 may create a subset for the source name attribute having a string value of "Internet" with an occurrence count of two and create another subset for the source name attribute having string values "Sales Department" and "Engineering Department," each having an occurrence count of one. Accordingly, in this example, search engine 110 partitions the value set for the exemplary generic attribute "source name" into two subsets, each having a total of two occurrences. Search engine 110 may store the partitioned data values included in each subset in a database local to or remote from search engine 110.

After search engine 110 partitions the current value set, it determines whether all of the value sets for the generic attributes have been partitioned (Step 630). If not (Step 630; NO), search engine 110 may select a next generic attribute value set for partitioning (Step 640), and returns the guided navigation process to Step 620. If, however, all of the value sets have been partitioned (Step 630; YES), search engine 110 configures each value set for guided navigation presentation (Step 650).

Accordingly, search engine 110 may categorize the result objects into generic attribute sets (i.e., value sets) that are partitioned into subsets. Each of the subsets are associated with certain result objects based on the object's attributes, type, and metadata defined in the metadata table(s).

Figure 7:
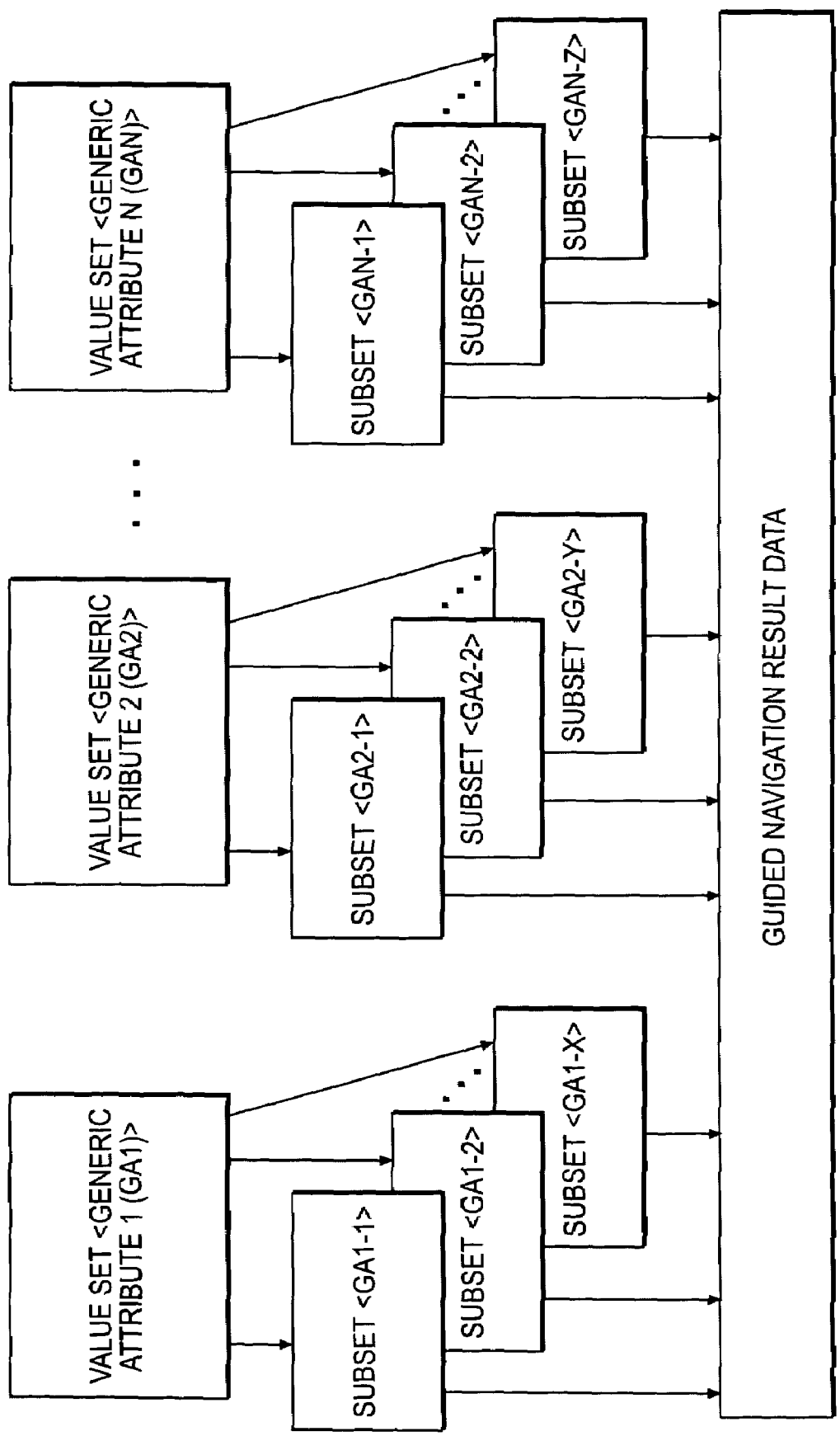
FIG. 7 illustrates a functional block diagram of an exemplary partition process consistent with certain aspects related to the present invention.

To provide a conceptual view of the partitioning process, FIG. 7 illustrates a block diagram of partitioned values sets that are used for generating guided navigation result data in accordance with certain aspects of the present invention. As shown, N values sets (e.g., GA1 to GAN) are partitioned into respective subsets. For instance, value set GA1 may be partitioned into X subsets (e.g., GA1-1 to GA1-X), value set GA2 may be partitioned into Y subsets (e.g., GA2-1 to GA2-Y), and value set GAN may be partitioned into Z subsets (e.g., GAN-1 to GAN-Z), where X, Y, and Z are positive integers greater than zero. Thus, depending on the types of objects that are associated with the metadata values included in each value set, the size and number of subsets may vary.

Each of the subsets (e.g., GA-1 to GAN-Z) are then used to generate the guided navigation result data presented to the user who generated the search request. Thus, search engine 110 retrieves the subset data previously stored to generate one or more user interface data that is used to formulate the content displayed to the user.

Exemplary Guided Navigation User Interfaces

In one aspect, search engine 110 generates user interface data corresponding to each subset for each value set. Search engine 110 uses this data to produce guided navigation user interfaces that are displayed to a user for refining the search result list produced by search engine 110.

Figure 8:
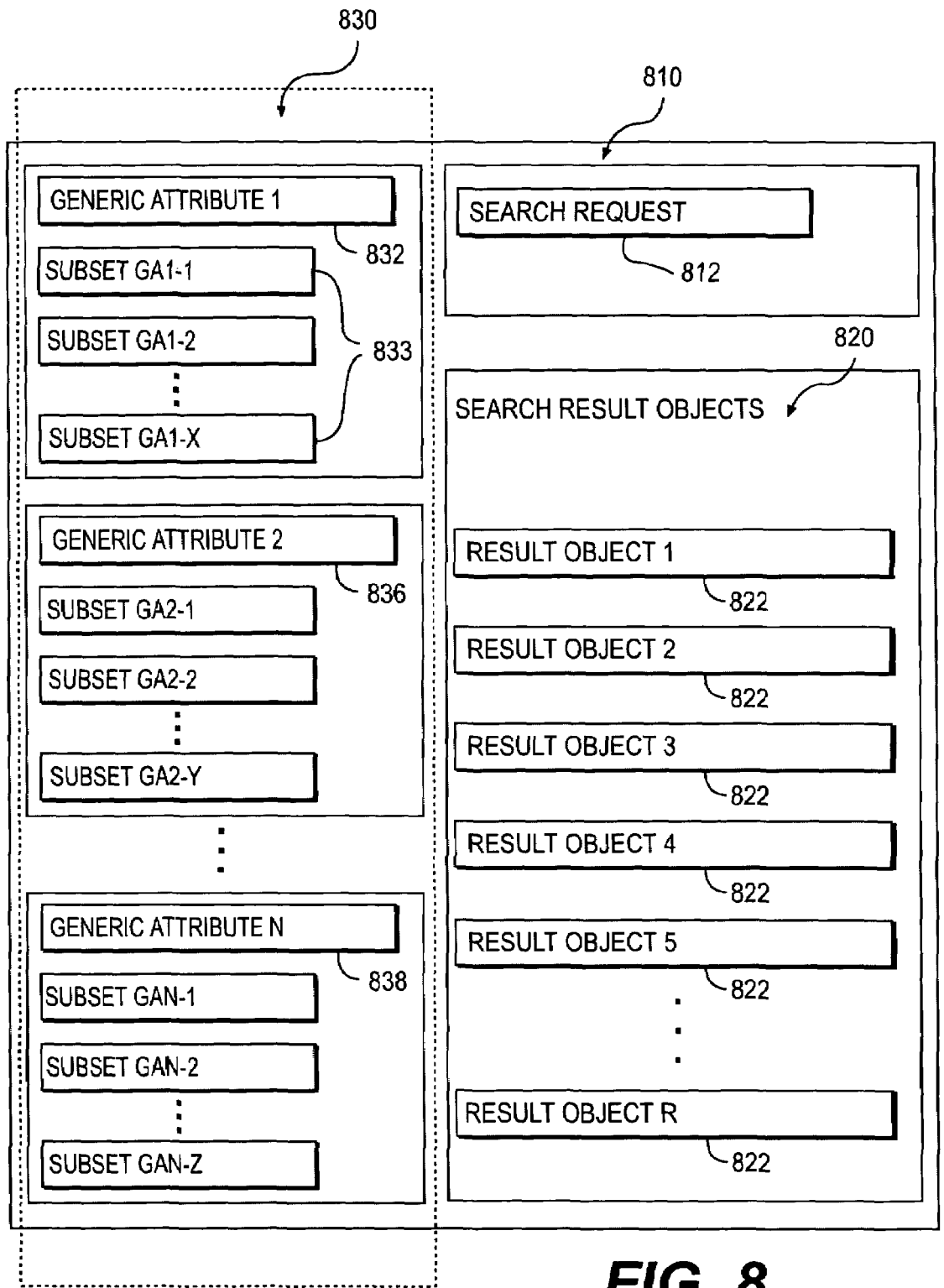
FIG. 8 illustrates a block diagram of an exemplary guided navigation results interface consistent with certain aspects related to the present invention.

FIG. 8 illustrates an block diagram of exemplary user interfaces 810, 820, and 830 that may be displayed by client 140 based on the guided navigation result data generated by search engine 110. User interface 810 that may include content reflecting the search request 812 formulated by the user. User interface 820 may include content reflecting search results produced by search engine 110. As shown, user interface 820 includes a result object list 822 that includes the result objects included in the search results produced by search engine 110 in response to search request 812. Because search engine 110 may group, rank, categorize, and list the search result objects in any manner, the configuration of user interface 820 is exemplary and described only for illustrative purposes.

User interface 830 reflects the guided navigation results produced by search engine 110 in a manner consistent with aspects related to the present invention. In one aspect, search engine 110 may generate a user interface for some or all of previously defined generic attributes (e.g., N generic attributes interfaces 832, 836, and 838, respectively). Because the number of value sets correspond to the number of generic attributes, each interface 832, 836, and 838 includes listings for each of the subsets for that particular value set. For example, user interface 832 corresponds to generic attribute GA1. Thus, interface 832 may include listings for the partitioned subsets GA1-1 to GA1-X related to the value set for generic attribute GA1. The same features may be provided for the other user interfaces generated by search engine 110 (e.g., interfaces 836 to 838).

Figure 9:
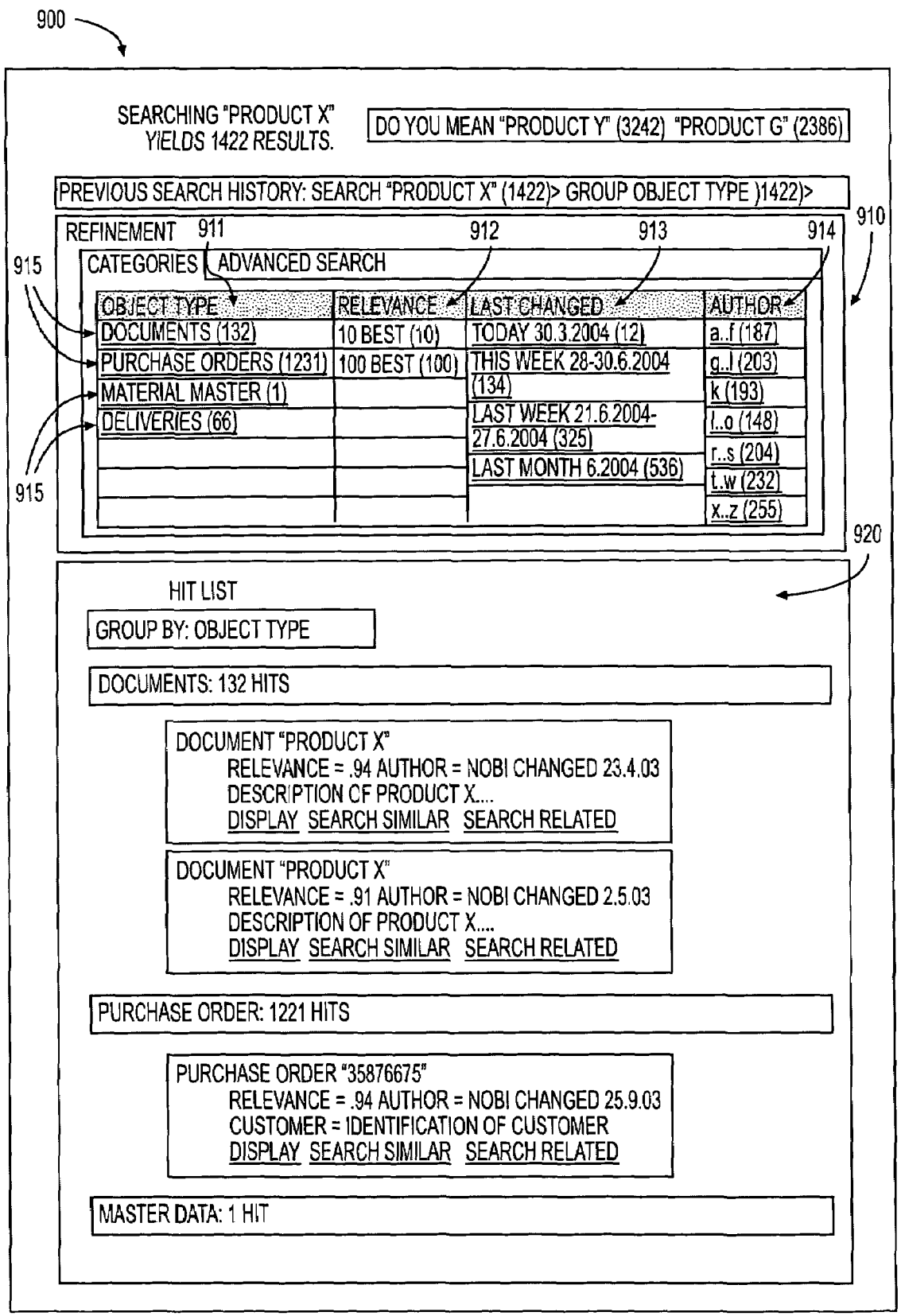
FIG. 9 illustrates a block diagram of an exemplary screenshot of a guided navigation results interface consistent with certain aspects related to the present invention.

A user may select one of the subset listings (e.g., 833) in guided navigation interface 830 to refine the search results 822 produced by search engine 110. For example, the displayed listing for each subset may include an identifier reflecting the number of result objects that are affiliated with that given subset. Thus, the user may view the identifiers for refining their search request. Further, aspects of the invention enable search engine 110 to provide other options for the user through different configurations of user interface 830. To better illustrate the guided navigation aspects of the invention, FIG. 9 shows a screenshot of an exemplary user interface 900 that client 140 may render for a user in response to a search request including the search term "product X." As a result of the guided navigation processes performed by search engine 110, client 140 may render user interface 900 that includes containers 910 and 920 that provide a guided navigation result interface and search result interface, respectively.

As shown, the user may select any of the categories 911, 912, 913, and 914 in the guided navigation result container 910 to further refine the result list displayed in the search result container 920. Each of the categories may reflect a given value set associated with a defined generic attribute. Within each category, subsets (e.g., subsets 915) are displayed to assist the user in refining the search results. For instance, the user may refine the search for information on "product X" based on the creation timestamp attribute (i.e., category 913), thus allowing the user to see the latest objects associated with "product X." Alternatively, the user may refine the search based on the author attribute (i.e., category 914) that provides subsets listed in alphabetically groups.

The above described user interfaces are exemplary and are not intended to be limiting. Methods and systems consistent with aspects related to the present invention may generate and display different types of user interfaces that reflect the guided navigation processes performed by search engine 110.

For purposes of explanation only, certain aspects of the present invention are described herein with reference to the components illustrated in FIG. 1. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 2, 4, 5, and 6 are exemplary and not intended to be limiting. Thus, other method steps may be used, and even with the methods depicted in FIGS. 2 and 4-6, the particular order of events may vary without departing from the scope of the present invention. Moreover, certain steps may not be present and additional steps may be implemented in FIGS. 2 and 4-6. Also, the processes described herein are not inherently related to any particular apparatus and may be implemented by any suitable combination of components.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method for providing guided navigation across different object types, comprising:
   receiving a search request;
   retrieving result objects in response to the search request, the result objects comprising the different object types, including a database object and an unstructured object;
   creating a metadata database, by:
   defining a number of the object types;
   defining a number of generic attributes associated with the object types;
   configuring the metadata database based on the defined number of object types and generic attributes; and
   defining metadata, for each generic attribute of each object type, which maps an individual attribute of the object type to the corresponding generic attribute;
   accessing the metadata database to obtain the metadata;
   normalizing the result objects based on the accessed metadata, wherein the accessed metadata is associated with the generic attributes related to each of the object types, the accessed metadata including a mapping of one of the generic attributes to both the database object and the unstructured object;
   generating guided navigation results across the different object types of the result objects based on the normalization; and
   storing the generated guided navigation results in a memory.

2. The computer-implemented method of claim 1, wherein normalizing the result objects includes:
   for each object type,
   creating a value set for each of the generic attributes; and
   adding to each value set metadata associated with a given generic attribute and individual attributes for the given object type.

3. The computer-implemented method of claim 2, wherein the metadata includes mappings between the generic attributes and individual attributes for the given object type.

4. The computer-implemented method of claim 1, wherein generating guided navigation results includes:
   grouping the result objects into groups; and
   generating a user interface corresponding to the groups to enable a user to refine the search result.

5. The computer-implemented method of claim 1, wherein generating guided navigation results includes:
   partitioning the value sets into subsets; and
   generating the guided navigation results based on the subsets that enable a user to refine the search result.

6. The computer-implemented method of claim 1, wherein the metadata maps individual attributes of each object type to the generic attributes.

7. The computer-implemented method of claim 1, wherein the object types include object types corresponding to structured and unstructured objects.

8. The computer-implemented method of claim 1, wherein generating the guided navigation results include:
   providing a user interface that groups the result objects into categories corresponding to the object types of the result objects.

9. A computer-implemented method for providing guided navigation across different object types, comprising:
   defining the object types for result objects that are generated in response to a search request, the result objects including a database object and an unstructured object;
   defining generic attributes common to the object types;
   generating a database comprising the object types and generic attributes;
   defining a number of the object types;
   defining a number of the generic attributes associated with the object types;
   configuring the database based on the defined number of object types and generic attributes;
   defining metadata, for each generic attribute of each object type, which maps an individual attribute of the object type to the corresponding generic attribute;
   accessing the metadata database to obtain the metadata;
   normalizing the result objects based on the accessed metadata, wherein the accessed metadata is associated with the generic attributes related to each of the object types, the accessed metadata including a mapping of one of the generic attributes to both the database object and the unstructured object;

generating guided navigation results across the different object types of the result objects based on the normalization; and storing the generated guided navigation results in a memory.

10. The computer-implemented method of claim 9, wherein generating the database includes:
for each object type:
defining, for each generic attribute, metadata that maps an individual attribute of the object type to the corresponding generic attribute.

11. The computer-implemented method of claim 9, further including:
generating search results in response to the search request, the search results including result objects of different types;
generating, based on the metadata, guided navigation results that categorize the search results into groups corresponding to the object types.

12. The computer-implemented method of claim 9, wherein defining generic attributes includes:
determining generic attributes that reflect characteristics that describe one or more individual attributes of the object types.

13. The computer-implemented method of claim 9, wherein the object types include a first object type that is in a structured format and a second object type that is in an unstructured format.

14. The computer-implemented method of claim 13, wherein the second object type is associated with documents that are obtained from the Internet.

15. The computer-implemented method of claim 13, wherein the first object type includes objects that are associated with a structured database.

16. The computer-implemented method of claim 15, wherein the object types include a third object type that is in a structured format and includes objects that are associated with a second structured database.

17. The computer-implemented method of claim 13, wherein the metadata includes:
first metadata corresponding to individual attributes associated with the first object type and each of the generic attributes; and
second metadata corresponding to individual attributes associated with the second object type and each of the generic attributes.

18. The computer-implemented method of claim 17, further including:
generating result objects based on a received search request, the generated result objects including objects that are of the first object type and second object type;
generating a value set for each generic attribute based on the first and second metadata; and
partitioning each value set into subsets that reflect guided navigation across the first and second result object types.

19. The computer-implemented method of claim 18, wherein generating a value set includes:
generating a first value set for a first generic attribute by:
adding the metadata corresponding to the first generic attribute and each object type into the first value set.

20. A computer storage medium comprising program instructions, which, when executed by a processor, cause the processor to perform a method for providing guided navigation across different object types, the method comprising:
receiving a search request;
retrieving result objects in response to the search request, the result objects comprising the different object types, including a database object and an unstructured object;
creating a metadata database, by:
defining a number of the object types;
defining a number of generic attributes associated with the object types;
configuring the metadata database based on the defined number of object types and generic attributes; and
defining metadata, for each generic attribute of each object type, that maps an individual attribute of the object type to the corresponding generic attribute;
accessing the metadata database to obtain the metadata;
normalizing the result objects based on the accessed metadata, wherein the accessed metadata is associated with the generic attributes related to each of the object types, the accessed metadata including a mapping of one of the generic attributes to both the database object and the unstructured object; and
generating guided navigation results across the different object types of the result objects based on the normalization.

21. A system, including a processor and memory, for providing guided navigation across different object types of result objects, including:
a first computer system that provides a search request; and
a second computer system that:
generates search results based on the search request, the search results including result objects, retrieved in response to the search request, the result objects comprising the different object types, and including a database object and an unstructured object,
creates a metadata database, by:
defining a number of the object types;
defining a number of generic attributes associated with the object types,
configuring the metadata database based on the defined number of object types and generic attributes; and
defining metadata, for each generic attribute of each object type, that maps an individual attribute of the object type to the corresponding generic attribute;
accesses the metadata database to obtain the metadata;
normalizes the result objects based on the accessed metadata, wherein the accessed metadata is associated with the generic attributes related to each of the object type, the accessed metadata including a mapping of one of a plurality of generic attributes to both the database object and the unstructured object, and
generates guided navigation results across the different object types of the result objects based on the normalization.

22. The system of claim 21, wherein the second computer system normalizes the result objects by:
for each object type,
creating a value set for each of the plurality of generic attributes corresponding to each individual attribute, and
adding to each value set metadata associated with a given generic attribute and individual attributes for the given object type.

23. The system of claim 22, wherein the metadata includes mappings between the plurality of generic attributes and individual attributes for the given object type.

24. The system of claim 21, wherein the second computer system generates the guided navigation results by:
  grouping the result objects into groups; and
  generating a user interface corresponding to the groups to enable the first computer system to refine the search result.

25. The system of claim 22, wherein the second computer system generates the guided navigation results by:
  partitioning the value sets into subsets; and
  generating the guided navigation results based on the subsets that enable a user to refine the search result.

26. The system of claim 21, wherein the metadata maps individual attributes of each object type to the plurality of generic attributes.

27. The system of claim 21, wherein the object types include object types corresponding to structured and unstructured objects.

28. The system of claim 21, wherein the second computer system generates the guided navigation results by:
  providing a user interface that groups the result objects into categories corresponding to the object types of the result objects.

29. The computer-implemented method according to claim 1, wherein the unstructured object is a document.

30. The computer-implemented method according to claim 1, wherein the generic attributes include an object type, an object name, a creation timestamp, an author, or a source name.

31. The computer-implemented method according to claim 1, wherein the generic attributes include an object type, an object name, a creation timestamp, an author, and a source name.

32. The computer-implemented method according to claim 31, wherein the object name generic attribute is mapped to both:
  a URL of the unstructured object; and
  a first field of the database object.

33. The computer-implemented method according to claim 31, wherein the source value generic attribute is mapped to both:
  a string value of the unstructured document; and
  a string value field in the database object.

\* \* \* \* \*